United States Patent [19]
Fletcher et al.

[11] 3,972,008
[45] July 27, 1976

[54] METHOD AND APPARATUS FOR GENERATING COHERENT RADIATION IN THE ULTRA-VIOLET REGION AND ABOVE BY USE OF DISTRIBUTED FEEDBACK

[76] Inventors: James C. Fletcher, Administrator of the National Aeronautics and Space Administration, with respect to an invention of; Melvin M. Saffren, Altadena, Calif.

[22] Filed: Dec. 17, 1974

[21] Appl. No.: 533,556

[52] U.S. Cl. .............................. 331/94.5 C; 330/4.3
[51] Int. Cl.² ......................................... H01S 3/081
[58] Field of Search ...................... 331/94.5; 330/4.3

[56] References Cited
UNITED STATES PATENTS
3,774,121  11/1973  Ashkin et al. .................. 331/94.5 M

*Primary Examiner*—William L. Sikes
*Attorney, Agent, or Firm*—Monte F. Mott; Paul F. McCaul; John R. Manning

[57] ABSTRACT

Helium in the superfluid state has been found to emit copious amounts of radiation in the ultra-violet region when excited by an electron stream. Conventional laser action using mirrors is impossible in superfluid helium because there are no mirrors that will reflect VUV radiation. By utilizing the well known method of "distributed feedback" the superfluid helium can be made to lase. By setting up a standing wave in superfluid helium that has a wavelength equal to, or harmonically related to, half the wavelength of the photon radiation chosen to be emitted as laser radiation by the superfluid helium, the need for end mirrors to produce reflection of the laser radiation is eliminated and reflection occurs instead at the wavefronts of the standing wave. The photons leave the superfluid helium at right angles to the standing wave as coherent radiation having a very high intensity. The standing wave established in the superfluid helium may be an acoustical standing wave, a thermal standing wave (second sound), or an electric standing wave.

30 Claims, 4 Drawing Figures

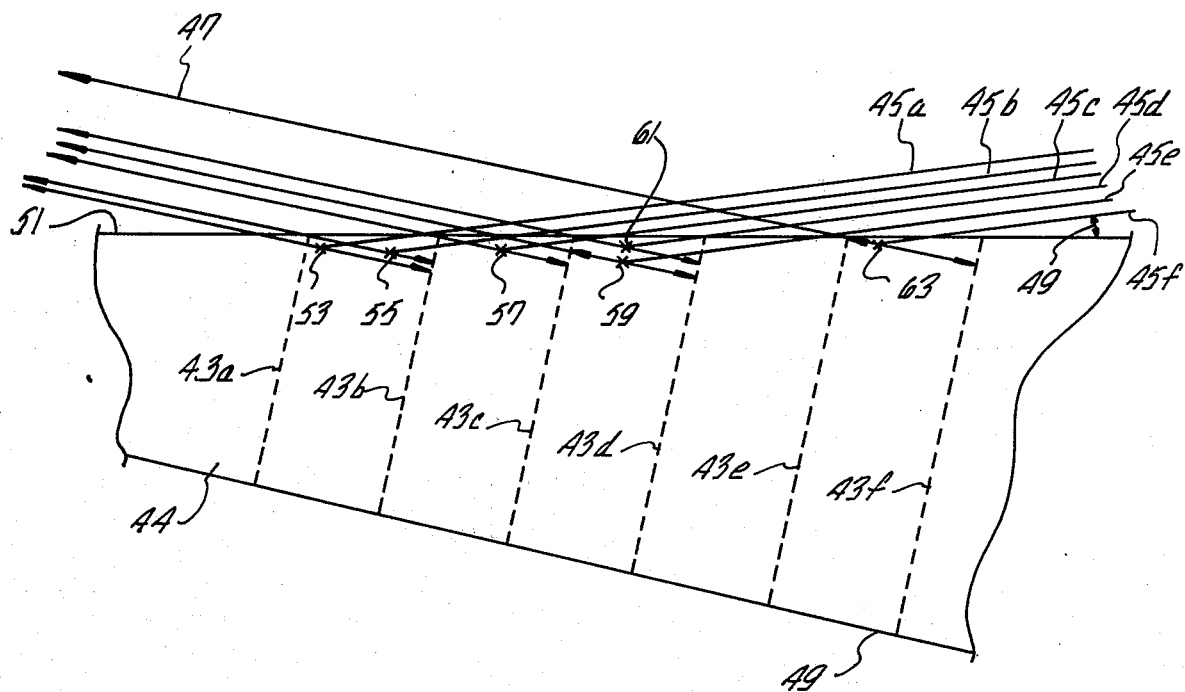
FIG_3.
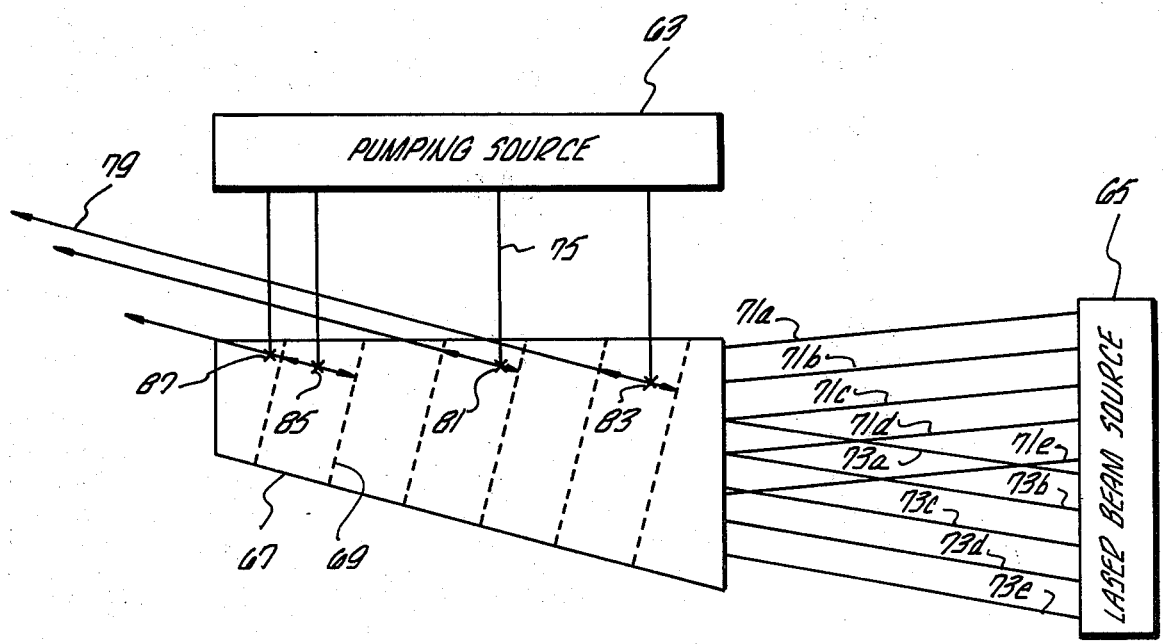
FIG_4.

METHOD AND APPARATUS FOR GENERATING COHERENT RADIATION IN THE ULTRA-VIOLET REGION AND ABOVE BY USE OF DISTRIBUTED FEEDBACK

BACKGROUND OF THE INVENTION

Origin of the invention

The invention described herein was made in the performance of work under a NASA Contract and is subject to the provisions of Section 305 of the National Aeronautics and Space Act of 1958, Public Law 85-568 (72 STAT. 435; 42 USC 2457).

FIELD OF THE INVENTION

The invention generally relates to coherent energy radiation in the vacuum ultra-violet region, and above. More particularly, this invention pertains to the use of distributed feedback techniques with active mediums that provide radiant energy having wavelengths in the vacuum ultra-violet region or smaller.

DESCRIPTION OF THE PRIOR ART

The generation of coherent energy in the optical region and regions below, having longer wavelengths has spawned many laser and maser devices that utilize the principle of a resonating Fabry-Perot cavity to create the photon feedback necessary for the coherent emission of photon energy. The most common prior art method of creating such a resonating cavity is to precisely space a pair of highly reflective mirrors at each end of the active medium. The photons emitted, as a result of population inversion that may be caused by pumping energy directed into the active medium, are reflected back and forth between these mirrors in an oscillatory manner, causing greater photon emission to occur. This photon emission exhibits the characteristic of having a like frequency and phase. In other words, the photon energy emitted from the active medium is coherent.

When coherent photon energy having wavelengths in the ultra-violet region or shorter is desired, or if the laser radiation is very intense, it becomes exceedingly difficult to manufacture reflecting mirrors that will reflect and not absorb a substantial amount of such photon energy. It has been found that the slightest flaw in the reflecting surface will absorb a substantial amount of such energy causing heating of that surface and consequent fracturing.

Prior art attempts to overcome this problem of creating a resonating cavity for photon energy having wavelengths in the ultra-violet region and shorter have resulted in the use of crystal structures as reflecting surfaces, in place of mirrors. These crystals reflecting surfaces reflect these high frequency photons in accordance with the Bragg reflection law. One example of a prior art attempt to create a resonating cavity by use of crystal material reflecting surfaces can be found in U.S. Pat. No. 3,617,939 to Walter L. Bond. Another example of a prior art attempt to create a resonating cavity for photon energy having wavelengths shorter than the visible frequency range can be found in U.S. Pat. No. 3,233,107 to William P. Senett. These attempts did not prove to be very effective.

Other researchers, meanwhile, discovered that lasing action will occur in an active medium without the use of mirrors or crystal reflecting surfaces. If a specific periodic perturbation is created in the active medium, this perturbation will cause feedback by way of backward Bragg scattering. Such laser structures are known as distributed feedback (DFB) structures. A discussion of the operation of a distributed feedback laser and the theory advanced for explaining such operation can be found in an article titled "Coupled-Wave Theory of Distributed Feedback Lasers," written by H. Kogelnik and C. V. Shank, in the Journal of Applied Physics, Volume 43, No. 5, May 1972.

This discovery led other researchers to discover that a periodic structure may be created by setting up a standing wave condition in a gaseous medium through the use of a pair of like coherent energy beams directed into the medium. The affect of this periodic peturbation in an active gaseous medium was studied for gases that emit photon energy above the visible region. A description of the experiment and analysis of the results obtained therefrom can be found in an article written by S. A. Akhmanov and G. A. Lyakhov published in JETP letters, Volume 19, No. 7, Apr. 5, 1974.

The prior art had, prior to this, utilized acoustic standing waves with laser apparatus for extracting coherent radiation from a mode-locked laser. An example of this can be found in U.S. Pat. No. 3,529,263 to William W. Simmons. An ultrasonic acoustic standing wave is created in the resonating cavity of a laser mechanism for the purpose of reflecting the coherent radiation out of the cavity. Another exaple of prior art use of an ultrasonic standing wave in a laser mechanism can be found in U.S. Pat. No. 3,435,372 issued to Herbert G. Aas. This patent describes the use of an acoustic standing wave to gate the output of a solid medium laser to obtain repetitive pulses. The standing wave causes the photon energy emitted from the active medium to be a series of pulses that are synchronized to the frequency of the acoustic standing wave. In spite of all the work in this area, until the present invention, the possibility of creating a mechanism for emitting coherent radiation in the ultra-violet region and above, by use of distributed feefback techniques had not been brought to fruition.

OBJECTS AND SUMMARY OF THE INVENTION

An object of this invention is to provide high power coherent radiation in the vacuum ultra-violet region.

Another object of this invention is to provide coherent radiation from superfluid helium.

A further object of this invention is to provide coherent radiation in the vacuum ultra-violet region by use of distributed feedback.

Still another object of this invention is to provide coherent radiation in the ultra-violet region by setting up an acoustical standing wave in a liquid noble gas to provide the distributed feedback reflecting surfaces.

Yet another object of this invention is to provide coherent radiation in the vacuum ultra-violet region by setting up an acoustical standing wave in a superfluid bath of helium to provide the distributed feedback reflecting surfaces.

A further object of this invention is to provide coherent radiation in the ultra-violet region by setting up a "second sound" or thermal standing wave in a bath of superfluid helium to provide the distributed feedback reflecting surfaces.

Still a further object of this invention is to provide coherent radiation in the ultra-violet region by setting up an electric standing wave in a bath of superfluid helium to provide the distributed feedback reflecting surfaces.

These objects and the general purpose of this invention are accomplished by bombarding a liquid noble gas such as, superfluid helium with pumping energy such as, an electron stream, while maintaining a standing wave therein that has a wavelength that is harmonically related to half the wavelength of the photons emitted as a result of the bombardment. Bombarding superfluid helium with an electron stream produces a copious amount of radition in the vacuum ultra-violet region. By setting up a standing wave in the superfluid helium which has a wavelength that is harmonically related to half the wavelength of the photons emitted, the photons are distributively reflected by the wavefronts so that they are in phase. The reflected photons cause other excited helium atoms to, in turn, emit photons of like frequency and phase. The standing wave maintained in the superfluid helium may be acoustical, thermal or electric. The photons in the superfluid helium are reflected at right angles to the wavefronts of the standing wave. Inducing a standing wave in a tilted bath of superfluid helium causes a coherent photon beam to be emitted from the top of the bath. By adjusting the wavelength of the standing wave in the superfluid helium, it is possible to tune, over a small region, the photon emission from the superfluid helium.

BRIEF DESCRIPTION OF THE DRAWINGS

Other objects and many of the attendant advantages of this invention will be readily appreciated as the invention becomes better understood by reference to the following detailed description when considered in conjunction with the accompanying drawings in which like reference numerals designate like parts throughout the figures thereof and wherein:

FIG. 3 is an abstract illustration of the operating mechanism for an alternate embodiment of this invention.

FIG. 4 is an abstract illustration of the operating mechanism for yet another embodiment of this invention.

DESCRIPTION OF THE PREFERRED EMBODIMENTS

The design of a distributed feedback laser can be based on some fairly simple relations, if the following assumptions are made:
1. The active medium is infinite in the transverse plane (no boundry affects).
2. Only the first order Bragg condition is considered.

Assuming a spatial modulation of the refractive index $\eta(z)$ and of the gain constant $\alpha(z)$ of the form:

$\eta(z) = \eta + \eta_1 \cos Kz$
$\alpha(z) = \alpha + \alpha_1 \cos Kz$ where $\eta$ = index of refraction and
$\eta_1 << \eta$
$\alpha_1 << \alpha$ the oscillation wavelength is given by $$\lambda \cong \frac{2\eta}{m}\left(\frac{2\pi}{K}\right) = \frac{2\eta}{m}\Lambda$$

$$\Lambda = \frac{\lambda m}{2\eta}$$

where $m$ = Bragg order integer
$\lambda$ = photon wavelength in vacuum
$\Lambda$ = spacing For high gain:
$\alpha >> (\pi\eta_1/\lambda) + j\alpha_1/2$ the oscillation condition for high gain is:
$4\alpha^2 e^{-2\alpha L} \cong (\pi\eta_1/\lambda)^2 + \alpha_1^2/4$ where L = laser length For low gain:
$\alpha << (\pi\eta_1/\eta) + j\alpha_1/Z$ the oscillation condition for low gain is:
$\alpha L \cong (\lambda/\eta_1 l)^2$ for $\alpha_1 = 0$
$\alpha_1 \cong \pi/L$ for $\eta_1 = 0$ Taking a specific example where:
$\alpha_1 = 0$, $\eta_1 = 10^{-6}$ and $\lambda = 08\mu$ (800 A)
for the low gain case:

$$\alpha L = (\lambda/\eta_1 L)^2$$

$$\alpha L^3 = \left(\frac{8\times10^{-6}}{10^{-6}}\right)^2$$

$$= 64 \text{ cm}^2$$

for L = 10 cm
$\alpha = 64.10^{-3}$ cm$^{-1}$
or $\alpha L = .64$

The laser gain must be $> e^{\alpha L}$. In our case $e^{\alpha L} = e^{.64}$ which is $\cong 5$ db.

Therefore, if the lasing material has a gain of 5 db over 10 cm, an index perturbation of $10^{-6}$ is enough to have sufficient feedback at the first order Bragg condition.

Figure 1:
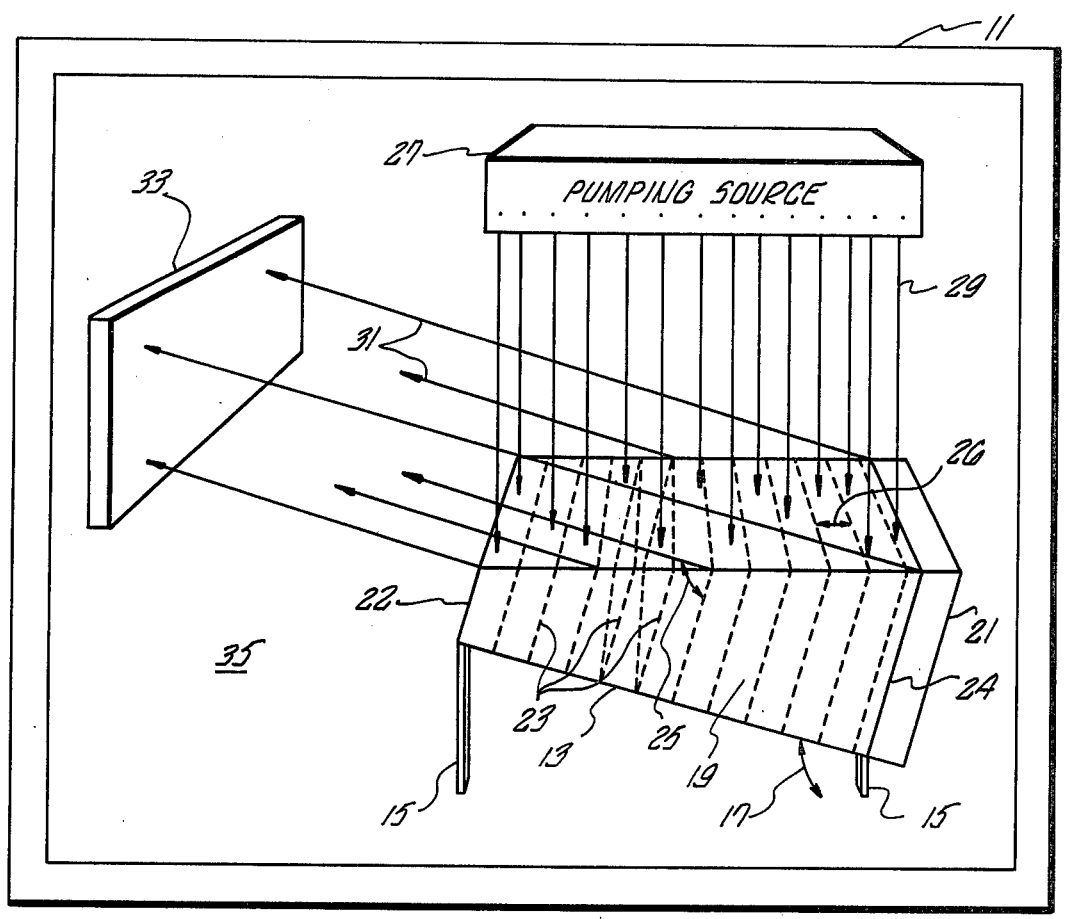
FIG. 1 is a block diagram partially in perspective illustrating a preferred embodiment of the invention.

Referring now to FIG. 1, a liquid active medium 19 in a container 13 is being injected with energy waves 29 from a pumping source 27, and in response thereto generating photon energy waves 31 towards a target or utilizaton device 33.

In order to obtain coherent radiation in the ultraviolet region, the active medium 19 may be the liquid or gaseous state of a noble gas usch as, helium argon, or xenon, for example. Since coherent ultra-violet radiation is very swiftly diffracted in the earth's atmosphere, any coherent photon energy 31 having a frequency in the ultra-violet region must be propogated in a vacuum environment 35, in order to have sufficient power, upon reaching the utilization device 33. Although the use of ultra-violet photon energy in the earth's atmosphere requires a vacuum chamber 11 as the working environment for such a mechanism, an ultra-violet laser is ideal for use in outer space because of the natural vacuum of space.

Assuming that the active medium 19 in container 13 is superfluid helium, the conainer 11, must maintain the atmosphere 35 within it at a hard vacuum, and at a temperature well below 2.178°K.

It has been found that when superfluid helium is injected with high energy electron beams 29 from an electron accelerator 27, a copious amount of photon energy is emitted. This discovery was made by W. A. Fitzsimmons of the Department of Physics at the University of Wisconsin.

Helium gas can be reduced to a superfluid state by a process known as regenerative cooling or the cascade method. Generally, this method pre-cools the helium gas by evaporating liquid hydrogen. As it is being pre-cooled, the helium is highly compressed. The highly compressed pre-cooled helium gas is then released through a small escape valve into a jacket surrounding the conpression chamber. The escaping gas falls in temperature because of the Joule-Thompson effect and on account of doing external work against the pressure in the jacket. The gas in the jacket communicates with the compression chamber, circulates around the chamber and acts as a heat exchanger. As each unit mass of the helium gas traverses again and again, the cycle composed of compressor, cooling coil, escape valve and jacket, it becomes progressively colder until finally it reaches its critical temperature. Further operation of the cycle results in the formation of liquid helium drops which accummulate in the lower part of the jacket. The cooling process continues until the superfluid state is reached at 2.178°K. At that time the superfluid helium can be drained off and maintained at a temperature of 2.178°K under vacuum.

As was noted above, bombarding the superfluid helium 19 with accelerated electron beams 29 which can be generated by an electron discharge device 27, such as is well known in the art, causes the superfluid helium to emit copious amounts of photon energy. However, this photon energy is not coherent. In order to produce coherent photon energy in the ultra-violet region, a standing wave having wavefronts 23 spaced apart a certain distance 26 must be established in the superfluid helium 19. The spacing of the wavefronts must be harmonically related to half the wavelength of the ultra-violet photon energy being emitted. The wavelengths emitted from superfluid helium have been found to be centered around 800 A.

The standing wave established may be an acoustic standing wave, a "second sound" or thermal standing wave, or an electric standing wave. To produce an acoustic standing wave, an acoustic transducer 21 is mounted at the large end 24 of the container 13. The transducer 21 may be a piezoelectric crystal driven by a high frequency oscillator (not shown). The frequency of the oscillator must be adjusted so that the wavelength of the standing wave is harmonically related to half the wavelength of the photon energy emitted by the superfluid helium. Preferably, the wavelength of the wave excited by this oscillator will equal half the wavelength of the emitted photons.

If a thermal standing wave is to be set up within the superfluid helium 19, the transducer 21 must be a thermal transducer that generates heat pulses in the superfluid helium 19. As will be more fully explained hereinafter, the presence of a standing wave in the superfluid helium 19 causes the emission of coherent ultra-violet radiation 31 from the superfluid helium 19, it is believed on the basis of the distributed feedback mechanism.

In order to facilitate as much of this ultra-violet radiation leaving the container 13 as possible, the bottom of the container 13 is tilted at an angle 17 to the horizontal and held in place by support members 15. This angle should be the maximum possible without affecting the establishment of a standing wave within the medium 19. The top of the container 13, is cut parallel to the horizontal. This causes a first end 22 to be much shorter in height than the second end 24, the first end 22 being as short as is feasibly possible without disturbing the maintenance of a standing wave in the medium 19.

The transducer 21, whether electroacoustic or thermal is mounted at the larger end 24 so that it will produce standing wave fronts 23 that are perpendicular to the tilted bottom of the container 13. Coherent photon energy is emitted from the container 13 at a 90° angle 25 to the standing wave fronts 23.

The pumping source 27 is illustrated as injecting electron beams 29 into the medium 19 through the top of the container 13. It should be understood, however, that pumping energy may be directed into the medium from the bottom or the sides, as well.

Figure 2:
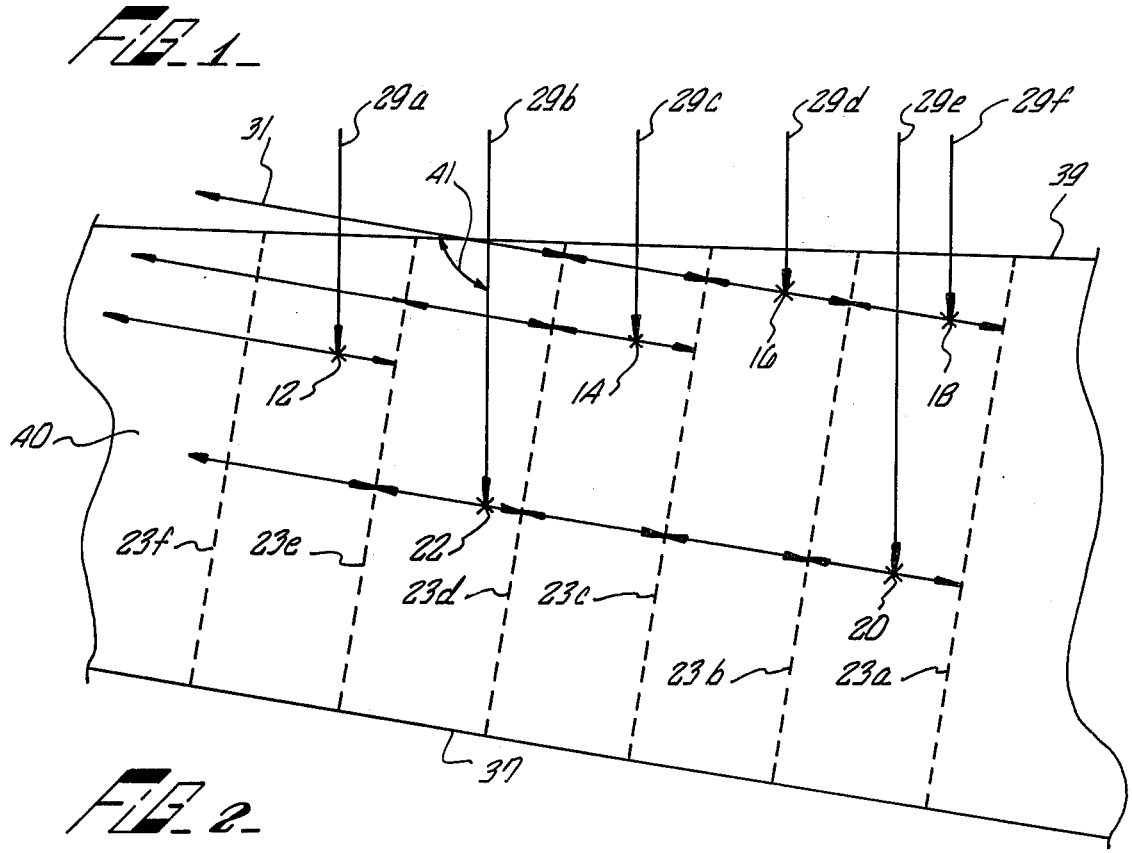
FIG. 2 is an abstract illustration of the operating mechanism of this invention.

Referring now to FIG. 2, a plurality of electron beams 29a to 29f are illustrated as bombarding an active medium 40 having sides 37 and 39. An acoustic standing wave having fronts 23a to 23f for example, may be set up in the medium in a manner similar to that taught by the above noted Simmon patent. However, in this instance, the acoustic standing wave is oriented with the path of travel of the photon energy 31.

An acoustic standing wave can be thought of as changes in pressure from an equilibrium value at a plurality of equally spaced points in a medium. By generating an acoustic standing wave, that has a wavelength ($\lambda$) that is equal to half the wavelength of the photons being emitted, the photon energy being reflected from the wavefronts 23a to 23f of the standing wave will be in phase thereby producing a distributed feedback effect.

The electron beams 29a to 29f, bombard the active medium 40 which may be superfluid helium, bringing about a population inversion, which creates a predominance of excited helium atoms. When an excited atom drops back to its stable state, it emits a photon having a characteristic frequency around 800 A. This activity is occurring in a random fashion at many points 12, 14, 16, 18, 20, 22, within the active medium 40. As a helium atom drops back to its stable level, the photon that is emitted will both pass through a standing wavefront and is partially reflected. Thus, for example, a helium atom at position 14 emits a photon that partially travels through the wavefront 23d and is partially reflected to encounter wavefront 23c, where again, the portion of the original photon reflected partially travels through wavefront 23c and is partially reflected.

This same activity is occurring at many other positions, 12, 16, 18, 20, 22, within the active medium. Because the wavefronts are spaced at a distance $\lambda$ apart that equals half the wavelength of the plurality of photons being emitted by the helium atoms, the photons being reflected by the wavefronts in the active medium 40 are all of the same frequency and phase. This creates distributed feedback effect which is comprehensively explained in the Kogelnik article, noted above.

The reflected photon energy impinges upon other helium atoms that have been raised to their excited state by the electron beam bombardment. This causes the impinged upon atoms to emit a photon that has a frequency and phase equal to that of the photon that impinged upon it. In this manner, a regenerative feedback is established that continues to maintain and build this activity. The coherent photon energy 31 that is not reflected by the standing wavefronts 23 passes through these wavefronts at a 90° angle to them into the vacuum surrounding the active medium 40.

By varying the spacing of the standing wavefronts 23a through 23f slightly, the frequency or wavelength of the photon energy 31 being emitted, can be tuned from 50 to 100 A around the central wavelength of 800 A.

Referring now to FIG. 3, a partial side view of an active laser medium 44 having a top 51 and a bottom 49 with standing wavefronts 43a to 43f established therein perpendicular to its bottom 49, is illustrated. Electron beams 45a to 45f, are directed into the active medium 44 at a very small angle 49 to the surface 51. The angle 49 may be approximately one or two degrees. Wherever electron beams excite the atoms of the active material such as, 53, 55, 57, 59, 61 or 63, photon emission occurs in the manner previously described. As a result of the induced standing wavefronts 43a to 43f, coherent energy 47 is emitted from the surface 51 of the active medium.

If the velocity of the electron beams 45a through 45f is made equal to the velocity of the coherent photon energy 47 being emitted from the active medium 44, the electron beams will not only produce excited atoms within the active medium but will, in addition, couple directly with the coherent radiation being emitted from the active medium. This will result in further amplification of the coherent radiation 47, in a manner known to occur in traveling wave maser devices. Matching the electron velocity to the velocity of the photon energy leaving the active medium becomes possible because the velocity of photon energy in an active medium such as, superfluid helium is much less than the velocity of photon energy in free space.

Referring now to FIG. 4, a pumping source 63 such as, an electron accelerator is shown as injecting electron beams 75 into a container 67 holding an active medium such as, superfluid helium. The container 67 has its bottom tilted to the horizontal, as shown. The electron beams bombarding the active medium causes a population inversion within the medium such as, at points 81, 83, 85 and 87. A distributed feedback effect is produced by an electric standing wave having fronts 69 that are perpendicular to the bottom of the container.

The electric standing wavefronts are produced in the medium by the interaction of a pair of coherent laser beams 71a through 71e and 73a through 73e. Laser beams 71 and 73 are preferably generated by a laser beam source 65 that comprises a single laser device such as, a flourescent dye laser mechanism, the dual beams being produced by a beam splitter mechanism that is well known in the art.

The interference pattern created between the two crossing laser beams produces a periodic perturbation within the active medium in container 67 that has a smaller wavelength than the laser beams themselves. By adjusting the frequency of the fluorescent dye laser, the periodicity of the standing wave perturbation in the active medium is adjusted to the particular active medium being utilized, thereby producing coherent radiation because of the distributed feedback effect.

In summary, what has been described is a method and apparatus for providing coherent radiation in the ultra-violet region and above. Copious radiation in the ultra-violet region is readily produced by bombarding superfluid helium by accelerated electron beams. Setting up of standing waves, either acoustical, thermal, or electrical in the medium circumvents the need for utilizing separate reflecting surfaces on either side of the medium to establish a resonant cavity. It should be understood, of course, that the foregoing disclosure relates only to preferred embodiments of the invention and that numerous modifications may be made therein without departing from the spirit and scope of the invention as set forth in the appended claims.

What is claimed is:

1. A method for generating coherent radiation in the ultra-violet region, comprising:
    establishing a bath of a liquid noble gas,
    maintaining a standing wave in said bath; and
    exciting the atoms of said noble gas to emit photons, whereby said photons are distributively reflected by the standing wave to produce further photon emission from other atoms of said liquid noble gas.

2. The method for generating coherent radiation of claim 1 wherein said liquid noble gas is superfluid helium.

3. The method for generating coherent radiation of claim 2 wherein said exciting step comprises:
    generating a plurality of accelerated electron beams; and
    bombarding said bath of superfluid helium with said electron beams.

4. The method for generating coherent radiation of claim 3 wherein said maintaining step comprises: cyclically driving an acoustical transducer attached to one end of said container.

5. The method for generating coherent radiation of claim 3 wherein said maintaining step comprises: cyclically driving a thermal transducer attached to one end of said container.

6. The method for generating coherent radiation of claim 3 wherein said maintaining step comprises: directing two, like frequency, coherent energy beams into said container, at a relative angle that will cause interference between the two beams.

7. The method for generating coherent radiation of claim 1 wherein said maintaining step comprises: cyclically driving an acoustical transducer attached to one end of said container.

8. The method for generating coherent radiation of claim 1 wherein said maintaining step comprises: directing two, like frequency, coherent energy beams into said container, at a relative angle that will cause interference between the two beams.

9. A method for generating coherent radiation having wavelengths in the ultra-violet region and smaller, comprising:
    maintaining a standing wave in an active medium;
    generating accelerated electron beams; and
    bombarding said active medium with said electron beams whereby said photons are distributively reflected by the standing waves to produce photon emission of like frequency and phase from other excited atoms in said active medium.

10. The method for generating coherent radiation of claim 9 wherein said maintaining step, comprises:
    cyclically driving an acoustical transducer attached to one end of said active medium.

11. The method for generating coherent radiation of claim 9 wherein said maintaining step, comprises: directing two, like frequency, coherent energy beams into said active medium, at a relative angle that will cause interference between the two beams.

12. A radiation system for generating coherent radiation in the ultra-violet region, comprising:
    a container having a liquid noble gas therein;
    transducing means attached to one end of said container for inducing a standing wave in said liquid noble gas; and a pumping source means for bombarding the liquid noble gas in said container with an energy stream.

13. The radiation system of claim 12 wherein the liquid noble gas in said container is superfluid helium.

14. The radiation system of claim 13 wherein said pumping source means comprises: an electron accelerator that supplies electron beams.

15. The radiation system of claim 14 wherein said transducing means comprises: an electroacoustical transducer, cyclically driven by an oscillator means.

16. The radiation system of claim 14 wherein said transducing means comprises: a thermal transducer.

17. The radiation system of claim 14 wherein said transducing means comprises: means for generating two, like frequency, coherent energy beams into said container of superfluid helium, at a relative angle that causes interference between the two beams.

18. The radiation system of claim 12 wherein said container of liquid noble gas has its bottom displaced at an angle to the horizontal with its top parallel to the horizontal, sides that are trapezoids, and the first end of said container larger than the second end.

19. The radiation system of claim 18 wherein said transducer means is attached to said second end.

20. The radiation system of claim 19 wherein said pumping source means comprises: an electron accelerator that directs electron beams that are perpendicular to the top of said container into said container.

21. The radiation system of claim 20 wherein the liquid noble gas in said container is superfluid helium.

22. The radiation system of claim 21 wherein said transducing means comprises and electroacoustical transducer cyclically driven by an oscillator means.

23. The radiation system of claim 21 wherein said transducing means comprises: a thermal transducer.

24. The radiation system of claim 21 wherein said transducing means, comprises: means for generating two, like frequency, coherent energy beams into said container, at a relative angle that causes interference between the two beams.

25. The radiation system of claim 19 wherein said pumping source means comprises: an electron accelerator that directs electron beams into the top of said container at a very small angle to the top of said container.

26. The radiation system of claim 19 wherein the liquid noble gas in said container is superfluid helium.

27. The radiation system of claim 26 wherein said transducing means comprises an electroacoustical transducer cyclically driven by an oscillator means.

28. The radiation system of claim 27 wherein said transducer means comprises: a thermal transducer.

29. The radiation system of claim 26 wherein said transducing means, comprises: means for generating two, like frequency, coherent energy beams into said container, at a relative angle that causes interference between the two beams.

30. A radiation system for generating coherent radiation having wavelengths in the ultra-violet region and smaller, comprising:
an active medium;
means for generating two, like frequency, coherent energy beams directed into said active medium at a relative angle that causes interference between the two beams, said beams inducing a standing wave in said active medium; and
a pumping source means for bombarding said active medium with an energy stream.

* * * * *